United States Patent
Orita et al.

(10) Patent No.: US 7,339,461 B2
(45) Date of Patent: Mar. 4, 2008

(54) TIRE INFLATION PRESSURE MONITORING DEVICE AND VEHICLE HAVING THE SAME

(75) Inventors: Masayoshi Orita, Saitama (JP); Koichi Shimamura, Saitama (JP); Koji Suzuki, Saitama (JP); Naoki Murasawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 127 days.

(21) Appl. No.: 11/391,547

(22) Filed: Mar. 29, 2006

(65) Prior Publication Data

US 2006/0224344 A1    Oct. 5, 2006

(30) Foreign Application Priority Data

Mar. 30, 2005    (JP)    ............... 2005-098159

(51) Int. Cl.
    *B60C 23/00*    (2006.01)
(52) U.S. Cl. .................. 340/442; 340/447; 340/438; 73/146; 73/146.5
(58) Field of Classification Search .............. 340/442, 340/443, 444, 445, 447, 446, 438; 73/146, 73/146.5
    See application file for complete search history.

(56) References Cited

U.S. PATENT DOCUMENTS 5,721,528 A * 2/1998 Boesch et al. ............... 340/442
5,847,645 A * 12/1998 Boesch ......................... 340/442
5,849,120 A * 12/1998 Drieux ......................... 152/416
6,002,327 A * 12/1999 Boesch et al. ............... 340/442

FOREIGN PATENT DOCUMENTS

JP    2003-182324 A    7/2003

* cited by examiner

Primary Examiner—Daryl C Pope
(74) Attorney, Agent, or Firm—Birch, Stewart, Kolasch & Birch, LLP

(57) ABSTRACT

A tire inflation pressure monitoring device and a vehicle having the same have a battery-driven unit provided on the tire side that can be reduced in size and power consumption. In a diagnosing unit, an ID comparing section outputs the result of detection of a tire inflation pressure to an inflation pressure calibrating section if a wheel ID included in a received signal coincides with a wheel ID recorded in a set value storing section. An atmospheric pressure detecting section calculates an atmospheric pressure at a present position according to an altitude at the present position. An inflation pressure calibrating section calibrates the result of detection of the tire inflation pressure to an inflation pressure at a reference atmospheric pressure. An inflation pressure diagnosing section compares the calibrated inflation pressure with a reference inflation pressure and inputs a predetermined error code into a storing section if the calibrated inflation pressure is lower than the reference inflation pressure. A diagnosing section reads the result of diagnosis corresponding to the error code recorded in the storing section, from the set value storing section and then outputs the result of diagnosis.

16 Claims, 10 Drawing Sheets

TIRE INFLATION PRESSURE MONITORING DEVICE AND VEHICLE HAVING THE SAME

CROSS-REFERENCE TO RELATED APPLICATIONS

This nonprovisional application claims priority under 35 U.S.C. § 119(a) on Patent Application No. 2005-098159, filed in Japan on Mar. 30, 2005, the entirety of which is incorporated herein by reference.

BACKGROUND OF THE INVENTION

1. Field of the Invention

The present invention relates to a tire inflation pressure monitoring device. In particular, the present invention relates to a tire inflation pressure monitoring device and a vehicle having the same wherein the tire inflation pressure monitoring device includes a tire inflation pressure detecting section provided on the tire side for detecting a tire inflation pressure and a tire inflation pressure diagnosing section provided on the vehicle body side for receiving the result of detection of the tire inflation pressure from the tire inflation pressure detecting section, calibrating the result of detection of the tire inflation pressure received above to an inflation pressure at a reference atmospheric pressure, and diagnosing the inflation pressure calibrated above.

2. Description of Background Art

There has been developed a tire inflation pressure monitoring device which can accurately detect a tire inflation pressure irrespective of an altitude at a present position even during running of a vehicle. For example, Japanese Patent Laid-Open No. 2003-182324 discloses a tire inflation pressure monitoring device including a tire inflation pressure sensor for detecting a tire inflation pressure, an atmospheric pressure sensor for detecting an atmospheric pressure, a pressure converting unit for converting the tire inflation pressure into an inflation pressure at a reference atmospheric pressure according to the detected atmospheric pressure, an inflation pressure determining unit for determining whether or not the tire inflation pressure converted above falls within a normal range, and a transmitter for transmitting an abnormal value for the tire inflation pressure to the vehicle body side. All of the tire inflation pressure sensor, the atmospheric pressure sensor, the pressure converting unit, the inflation pressure determining unit, and the transmitter are provided on the tire side.

In the background art mentioned above the tire inflation pressure sensor and the atmospheric pressure sensor, the pressure converting means, and the inflation pressure determining means are provided on the tire side. Accordingly, the tire inflation pressure monitoring device may be increased in size and power consumption.

SUMMARY OF THE INVENTION

It is accordingly an object of the present invention to provide a tire inflation pressure monitoring device and a vehicle having the same wherein a battery-driven unit provided on the tire side can be reduced in size and power consumption.

According to the present invention, there is provided a tire inflation pressure monitoring device including a tire inflation pressure detecting section provided on the tire provided on the vehicle body side for receiving the result of detection of the tire inflation pressure from the tire inflation pressure detecting section, calibrating the result of detection of the tire inflation pressure received above to an inflation pressure at a reference atmospheric pressure, and diagnosing the inflation pressure calibrated above. There is also provided a vehicle having the tire inflation pressure monitoring device described above. In the tire inflation pressure monitoring device and the vehicle mentioned above, the present invention includes the following points.

(1). The tire inflation pressure detecting section includes an inflation pressure sensor for detecting the tire inflation pressure and a unit for transmitting by radio the result of detection of the tire inflation pressure from the inflation pressure sensor. The tire inflation pressure diagnosing section includes a unit for receiving the result of detection of the tire inflation pressure from the transmitting unit, a unit for inputting position information on a present position, a unit for detecting an atmospheric pressure at the present position according to the position information input by the inputting unit, and a unit for calibrating the result of detection of the tire inflation pressure to the inflation pressure at the reference atmospheric pressure according to the atmospheric pressure detected by the atmospheric pressure detecting unit.

(2). The inputting unit inputs the position information on the present position from a GPS system.

(3). The inputting unit inputs the position information on the present position from a GPS system in a navigation unit.

(4). The vehicle includes a navigation unit for determining a present position. The tire inflation pressure detecting section includes an inflation pressure sensor for detecting the tire inflation pressure and a unit for transmitting by radio the result of detection of the tire inflation pressure from the inflation pressure sensor. The tire inflation pressure diagnosing section includes a unit for receiving the result of detection of the tire inflation pressure from the transmitting unit, a unit for obtaining position information on the present position from the navigation unit, a unit for detecting an atmospheric pressure at the present position according to the position information obtained by the obtaining unit, and a unit for calibrating the result of detection of the tire inflation pressure to the inflation pressure at the reference atmospheric pressure according to the atmospheric pressure detected by the atmospheric pressure detecting a unit.

(5). The navigation unit manages the position information in correspondence with altitude information.

(6). The vehicle further includes a unit for outputting the calibrated tire inflation pressure to a display of the navigation unit.

(7). The tire inflation pressure detecting section includes an inflation pressure sensor for detecting the tire inflation pressure and a unit for transmitting by radio the result of detection of the tire inflation pressure from the inflation pressure sensor. The tire inflation pressure diagnosing section includes a unit for receiving the result of detection of the tire inflation pressure from the transmitting unit and a unit for calibrating the result of detection of the tire inflation pressure to the inflation pressure at the reference atmospheric pressure according to atmospheric pressure information input thereto.

(8). The tire inflation pressure diagnosing section further includes an atmospheric pressure sensor. The calibrating unit calibrates the tire inflation pressure according to atmospheric pressure information detected by the atmospheric pressure sensor.

(9). The calibrating unit calibrates the tire inflation pressure according to atmospheric pressure information detected by an atmospheric pressure sensor for engine control.

According to the present invention, the following effects can be attained.

(1). According to a first aspect of the present invention, the present atmospheric pressure is determined according to an altitude at the present position. The tire inflation pressure is calibrated to the inflation pressure at the reference atmospheric pressure according to the result of determination of the present atmospheric pressure. Accordingly, it is not necessary to provide an atmospheric pressure sensor in the tire inflation pressure monitoring device.

(2). According to a second aspect of the present invention, the present position can be detected with high accuracy, so that the atmospheric pressure at the present position can be accurately obtained. As a result, the tire inflation pressure can be accurately diagnosed.

(3). According to a third aspect of the present invention, the position information on the present position can be obtained from the navigation unit already mounted on the vehicle. Accordingly, it is not necessary to provide any additional position determining system such as a GPS system, so that the number of parts can be reduced.

(4). According to a fourth aspect of the present invention, it is not necessary to provide a storing device for managing altitude information.

(5). According to a fifth aspect of the present invention, it is not necessary to provide any display unit for displaying the result of detection of the tire inflation pressure.

(6). According to a sixth aspect of the present invention, the atmospheric pressure sensor need not be provided in the tire inflation pressure detecting section provided on the tire side. Accordingly, the tire inflation pressure detecting section can be reduced in size and power consumption. Simultaneously, the tire inflation pressure can be accurately detected.

(7). According to a seventh aspect of the present invention, the result of detection of the tire inflation pressure is calibrated to the inflation pressure at the reference atmospheric pressure according to the atmospheric pressure detected by the atmospheric pressure sensor for engine control already mounted on the vehicle. Accordingly, it is not necessary to provide any additional atmospheric pressure sensor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
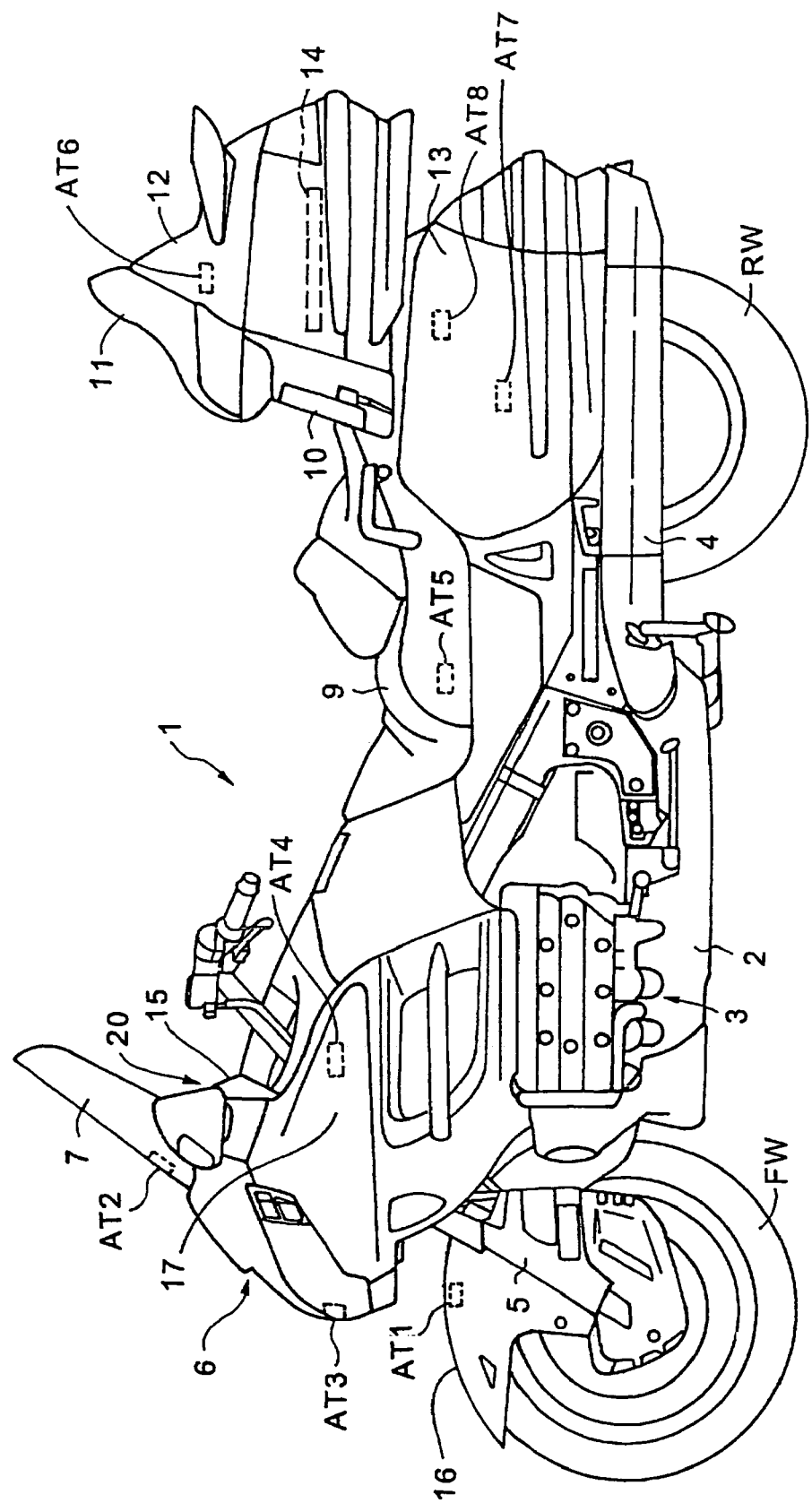
FIG. 1 is a side view of a motorcycle having the tire inflation pressure monitoring device of the present invention.
Figure 2:
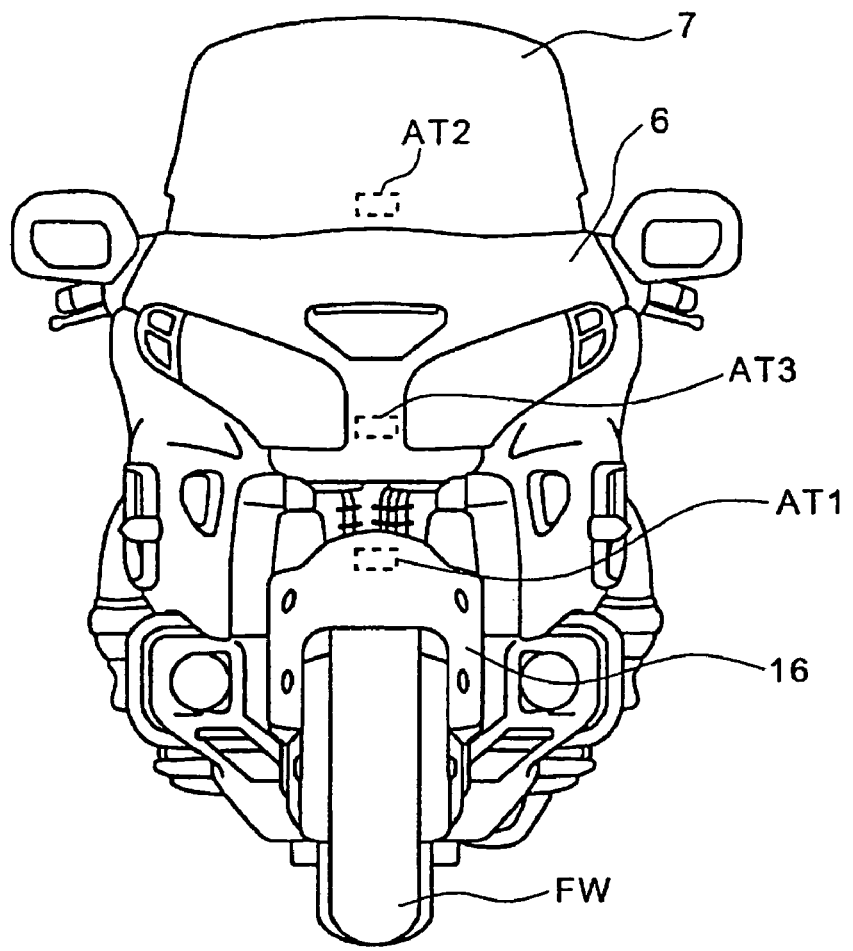
FIG. 2 is a front elevation of the motorcycle shown in FIG. 1.

The present invention will now be described with reference to the accompanying drawings, wherein the same or similar elements will be identified with the same reference numerals. FIG. 1 is a side view of a motorcycle 1 having the tire inflation pressure monitoring device of the present invention, and FIG. 2 is a front elevation of the motorcycle 1.

The motorcycle 1 includes a horizontally opposed, six-cylinder engine 2. An exhaust manifold 3 extends rearward from the engine 2. The exhaust manifold 3 is connected to a muffler 4. A front wheel FW is rotatably supported to the lower end of a front fork 5. A front portion of the vehicle body is covered with a front fairing (cowl) 6, and a windscreen 7 is provided at an upper portion of the front fairing 6. A driver seat 9 and a passenger seat 10 are arranged in tandem. A fuel tank (not shown) is provided under the driver seat 9. The passenger seat 10 is formed integrally with the driver seat 9 and has a seat back 11. A rear trunk 12 is provided behind the seat back 11. A side trunk 13 is provided under the rear trunk 12 on the right and left side of a rear wheel RW.

The vehicle 1 according to this preferred embodiment includes a navigation system for receiving GPS signals transmitted from a plurality of GPS satellites to determine a present position and to provide guide information on the way from the present position to a destination or reference position preliminarily recorded. A navigation unit 14 as a main control section of the navigation system is accommodated in the rear trunk 12, and a display unit 15 is provided below a meter panel 20.

A GPS antenna AT is provided at at least one of plural positions including the inside of a front fender 16 (AT1), the inside of the windscreen 7 (AT2), the inside of the front fairing 6 at its front end (AT3), the inside of a side cowl 17 (or front panel) (AT4), the inside of the driver seat 9 (AT5), the inside of the rear trunk 12 at a position behind the seat back 11 of the passenger seat 10 (AT6), the inside of the side trunk 13 (AT7), and the inside of a rear fender (AT8). When the GPS antenna AT6 is provided inside of the rear trunk 12, the antenna AT6 can also serve as a receiving antenna for a trunk opening/closing remote controller (not shown).

Figure 3:
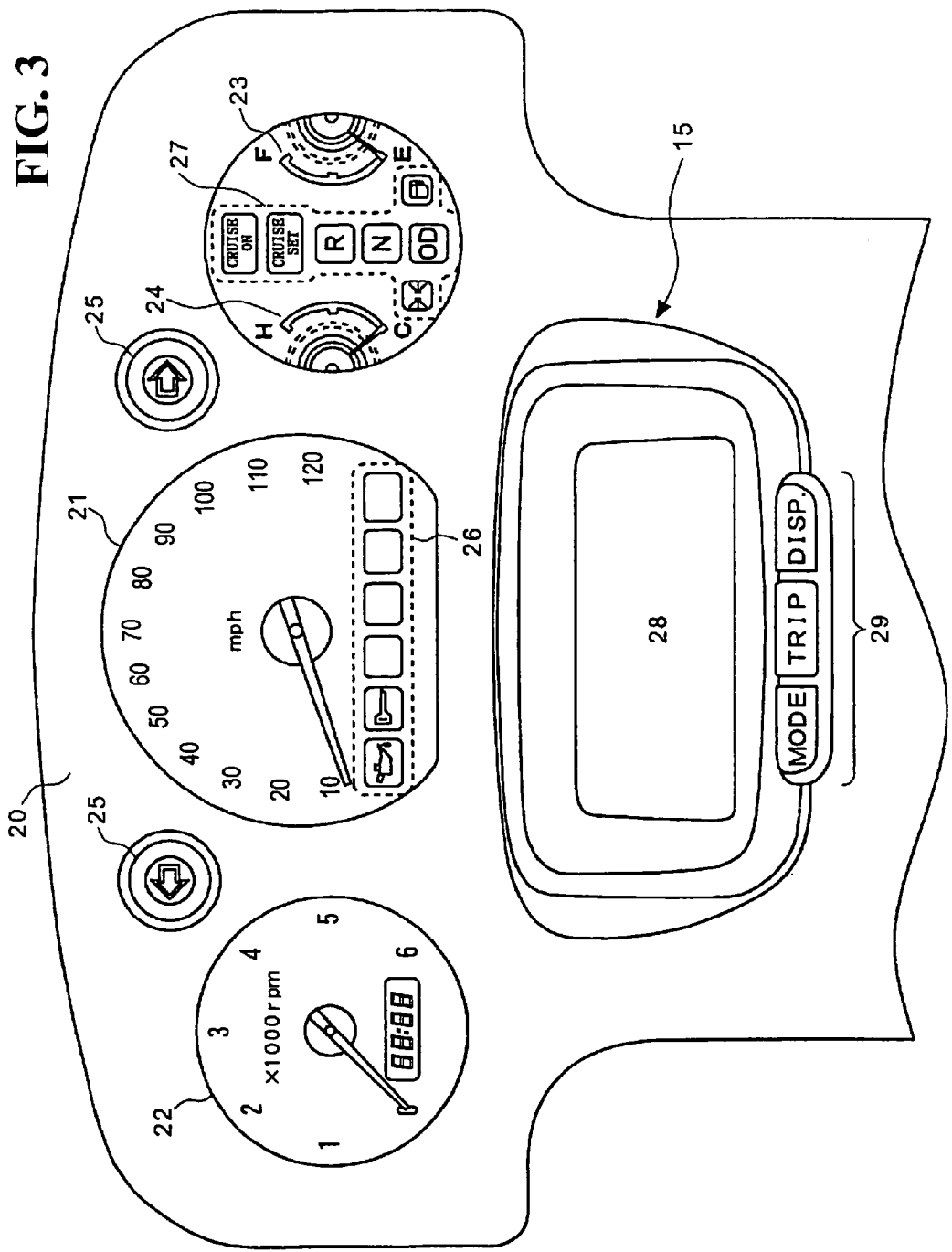
FIG. 3 is a plan view of the meter panel of the motorcycle as viewed from the driver seat side.

FIG. 3 is a plan view of the meter panel 20 of the motorcycle 1 as viewed from the driver seat 9 side. The navigation display unit 15 is provided below the meter panel 20 in an integral manner.

A speedometer 21 is provided at a central portion of the metal panel 20. A tachometer 22 is provided on the left side of the speedometer 21, and a fuel gauge 23 and a coolant temperature gauge 24 are provided on the right side of the speedometer 21. A pair of turn signal indicators 25 is provided on both sides of the speedometer 21 near its upper portion. The speedometer 21 is provided with various indicators including an oil indicator and an antitheft indicator and various indicator lamps 26 including a tire inflation pressure warning lamp. These indicators and indicator lamps 26 are horizontally arranged in a line. Furthermore, various indicator lamps 27 including an auto-cruise on indicator lamp and an auto-cruise set indicator lamp are vertically arranged between the fuel gauge 23 and the coolant temperature gauge 24. The navigation display unit 15 includes a liquid crystal display panel 28 at a central portion and various operation keys 29 horizontally arranged below the liquid crystal display panel 28.

Figure 4:
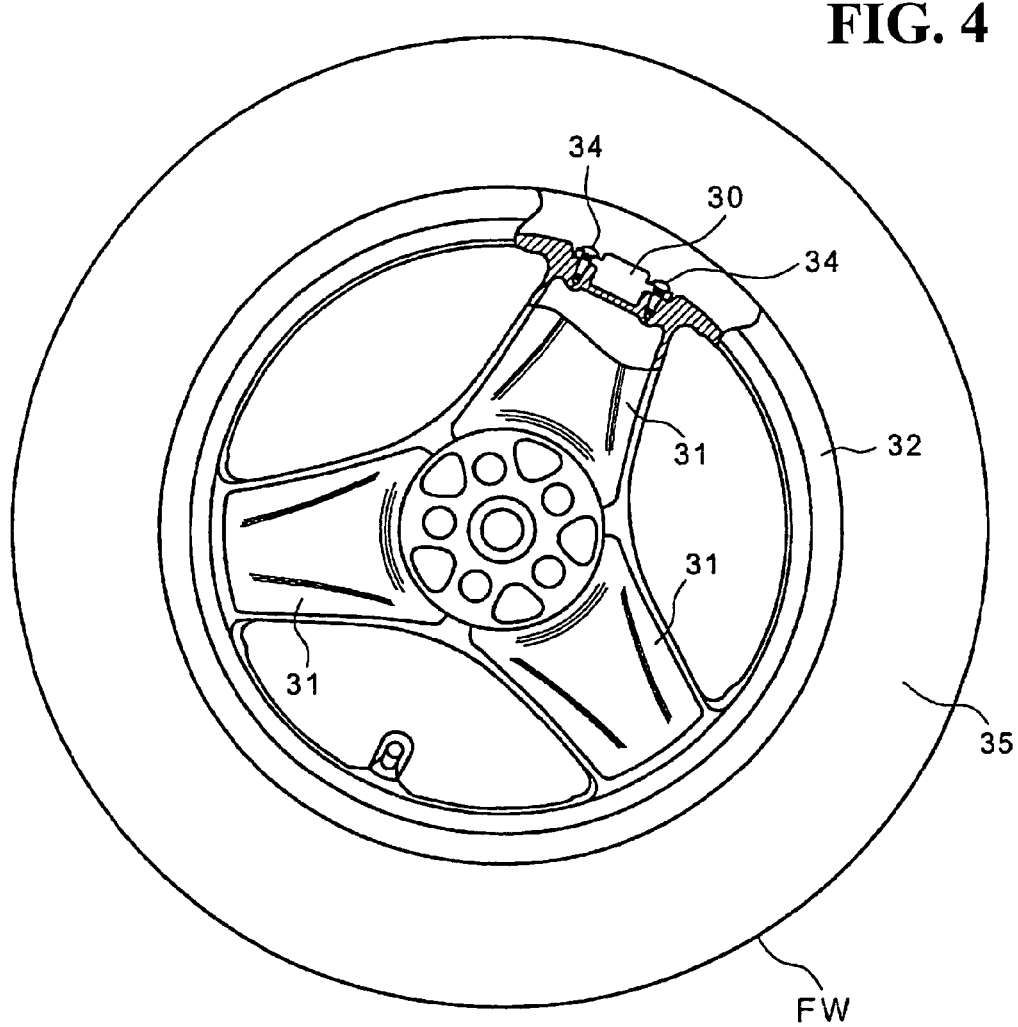
FIG. 4 is a partially cutaway side view of the front wheel FW.

FIG. 4 is a partially cutaway side view of the front wheel FW. The front wheel FW has three spokes 31, a wheel rim 32, and a tire 35. A tire inflation pressure sensor unit 30 for detecting an inflation pressure in the tire 35 as an absolute pressure and transmitting the detected inflation pressure by radio is provided at a connected portion between one of the spokes 31 and the wheel rim 32 in such a manner as to be embedded in the wheel rim 32 and be fixed thereto by two screws 34. Another sensor unit similar to the sensor unit 30 is also mounted in the rear wheel RW.

Figure 5:
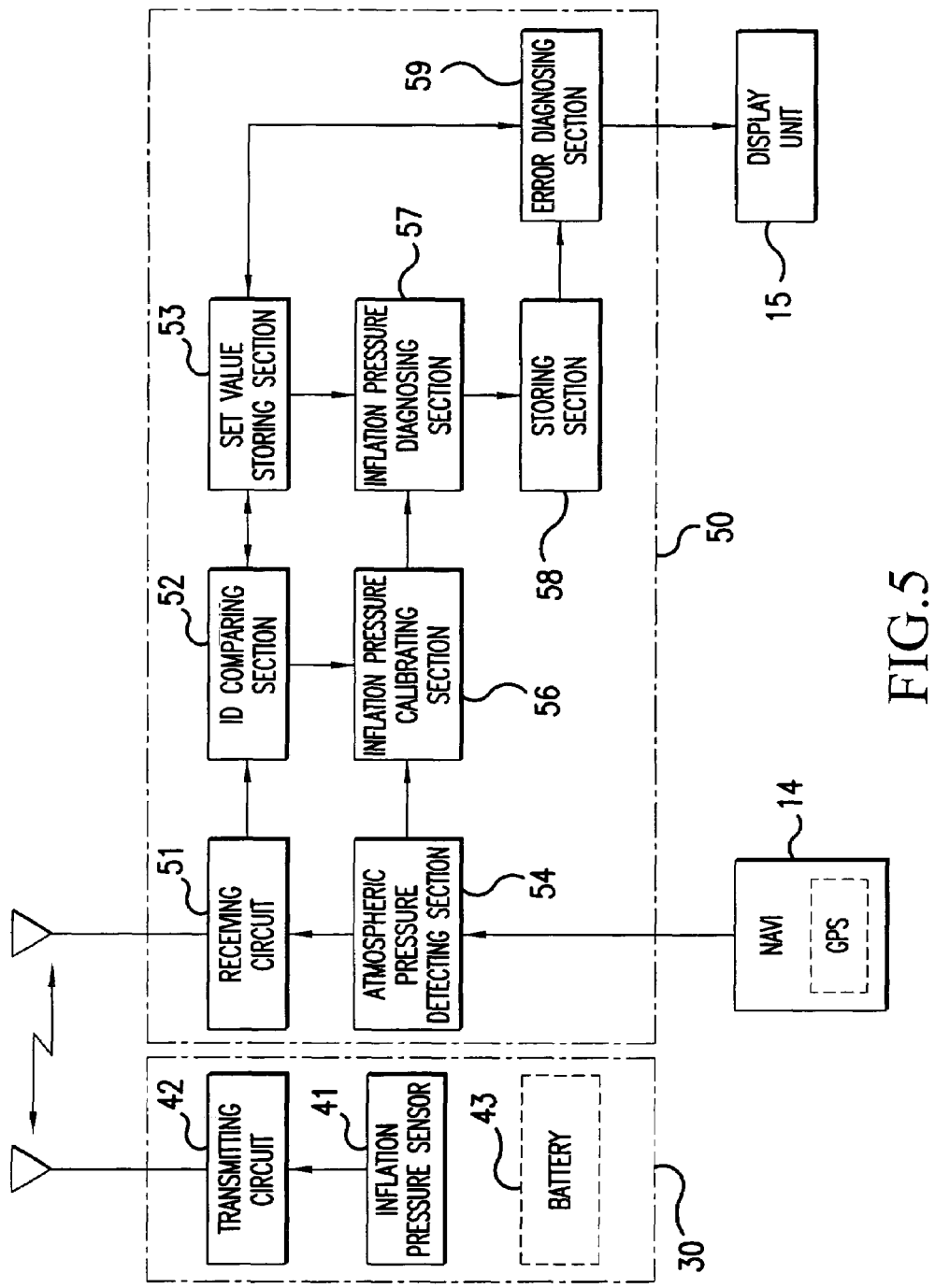
FIG. 5 is a block diagram of a first preferred embodiment of the tire inflation pressure monitoring device.

FIG. 5 is a block diagram of the inflation pressure sensor unit 30 and a diagnosing unit 50 for calibrating the tire inflation pressure detected by the inflation pressure sensor unit 30 to a tire inflation pressure at a reference atmospheric pressure and diagnosing the calibrated tire inflation pressure. In FIG. 5, the same reference numerals as those mentioned above denote the same or like parts.

The inflation pressure sensor unit 30 includes an inflation pressure sensor 41, a transmitting circuit 42, and a battery 43. The inflation pressure sensor 41 detects a tire inflation pressure as an absolute pressure. The tire inflation pressure is periodically detected by the inflation pressure sensor 41. The transmitting circuit 42 transmits by radio the result of detection of the tire inflation pressure together with a wheel ID (front wheel IDfw and rear wheel IDrw) specific to this vehicle and capable of identifying the front wheel FW or the rear wheel RW. In other words, when the sensor unit 30 is mounted in the front wheel FW, the detected tire inflation pressure of the front wheel FW is transmitted together with the front wheel IDfw specific to the front wheel FW. When the sensor unit 30 is mounted in the rear wheel RW, the detected tire inflation pressure of the rear wheel RW is transmitted together with the rear wheel IDrw specific to the rear wheel RW. The battery 43 supplies a driving power to the inflation pressure sensor 41 and the transmitting circuit 42.

The diagnosing unit 50 is provided on the vehicle frame side. The diagnosing unit 50 includes a receiving circuit 51, an ID comparing section 52, a set value storing section 53, an atmospheric pressure detecting section 54, an inflation pressure calibrating section 56, an inflation pressure diagnosing section 57, a storing section 58, and an error diagnosing section 59. The receiving circuit 51 receives a signal transmitted from the inflation pressure sensor unit 30. The ID comparing section 52 compares the wheel ID included in the received signal with a wheel ID preliminarily stored in the set value storing section 53. If the received wheel ID coincides with the stored wheel ID, the ID comparing section 52 outputs the result of detection of the tire inflation pressure and the wheel ID included in the received signal to the inflation pressure calibrating section 56.

The atmospheric pressure detecting section 54 calculates an atmospheric pressure at the present position determined by the GPS system mounted in the navigation unit (NAVI) 14 according to an altitude at the present position. More specifically, three-dimensional coordinates at the receiving point are first obtained according to the GPS signals. Secondly, the three-dimensional coordinates are converted into the World Geodetic System 1984 (WGS84) to obtain an altitude h. This altitude h is inserted into Eq. (1) shown below to obtain an atmospheric pressure P at the present position.

$$P=P_0*(1-0.0065*h/(T_0+273.2))^{5.258} \qquad \text{Eq. (1)}$$

$P_0=1013.2$ (hPa)
$T_0=15°$ C.
h: altitude (m)

The inflation pressure detecting section 56 calibrates the result of detection of the tire inflation pressure to an inflation pressure at a reference atmospheric pressure according to the above-obtained atmospheric pressure at the present position. The inflation pressure diagnosing section 57 compares the above-calibrated inflation pressure with a reference inflation pressure preliminarily stored in the set value storing section 53. If the calibrated inflation pressure is lower than the reference inflation pressure, the inflation pressure diagnosing section 57 outputs a predetermined error code according to the difference between the calibrated inflation pressure and the reference inflation pressure together with data on the calibrated inflation pressure to the storing section 58. The error diagnosing section 59 accesses the storing section 58 to check the recorded error code, and then reads out the result of diagnosis corresponding to the recorded error code from the set value storing section 53. The result of diagnosis read above is displayed on the display unit 15.

Figure 10:
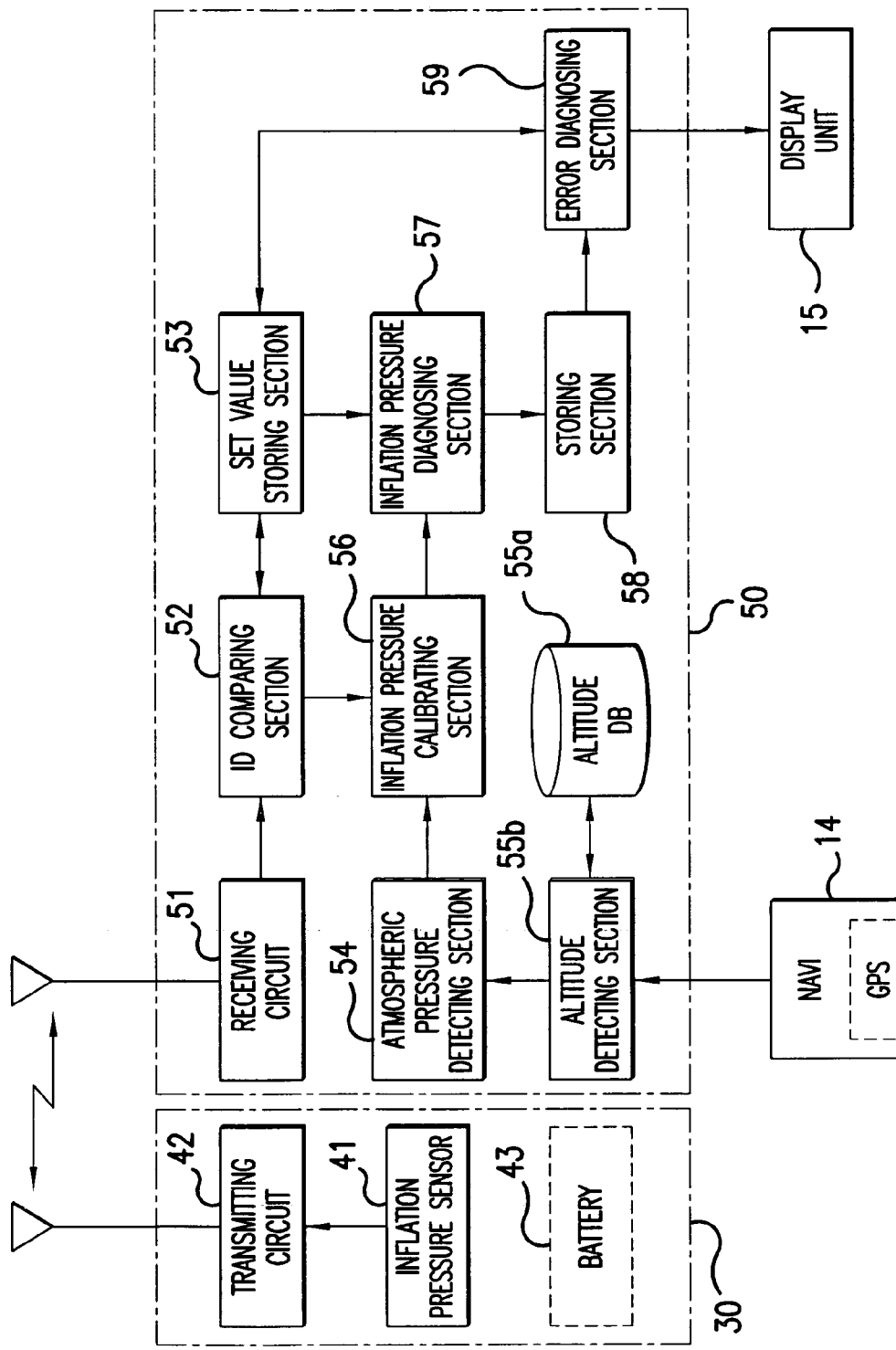
FIG. 10 is a block diagram of a modification of the first preferred embodiment of the tire inflation pressure monitoring device.

When the navigation unit (NAVI) 14 is of such a type that only a latitude and a longitude are output rather than the three-dimensional coordinates, the diagnosing unit 50 may be modified as shown in FIG. 10. In this modification, the diagnosing unit 50 additionally includes an altitude database 55a that preliminarily stores the relation between latitude/longitude and altitude at a present position and an altitude detecting section 55b for retrieving the altitude database 55a by using the latitude and longitude at the present position as a parameter to thereby detect the altitude at the present position.

Figure 6:
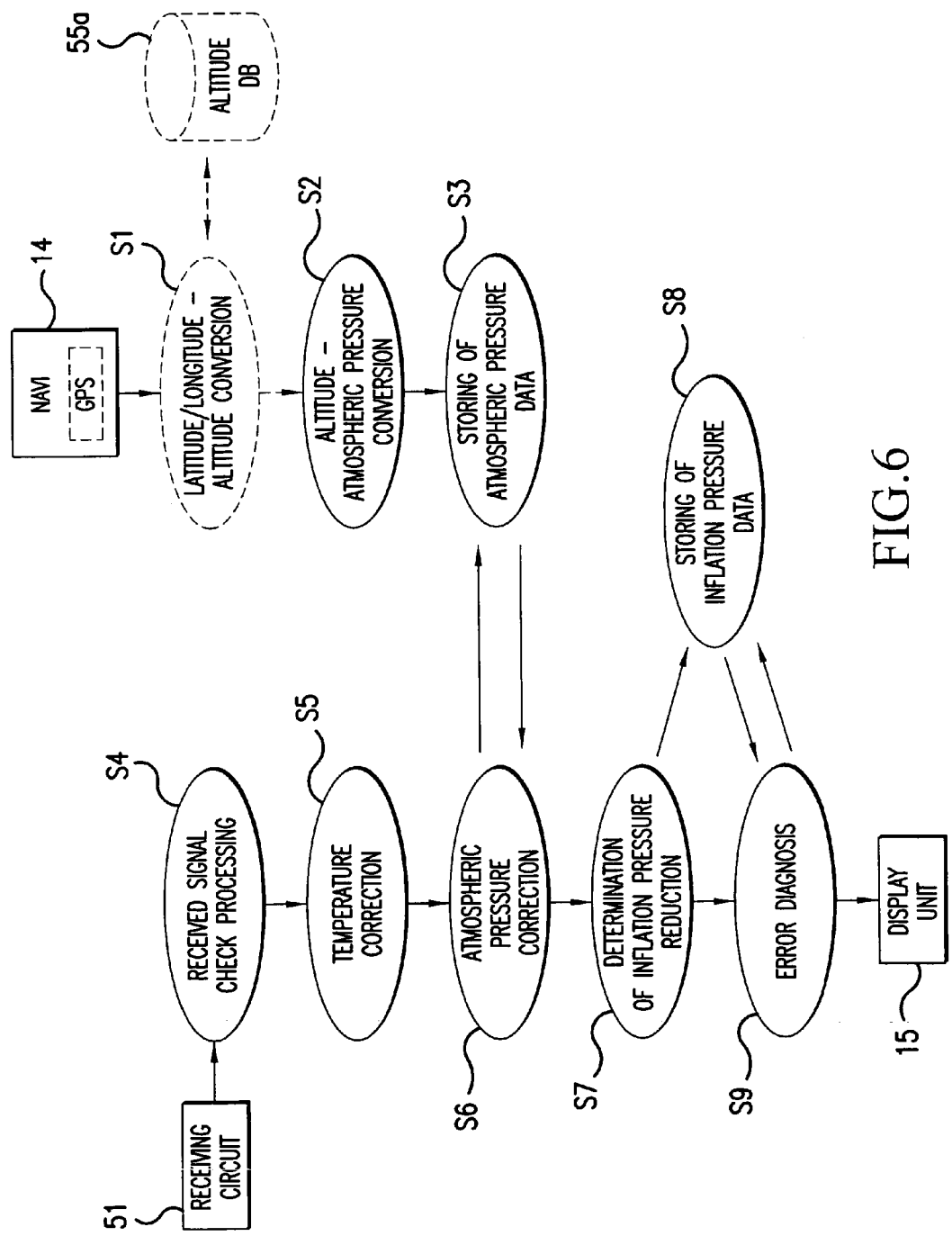
FIG. 6 is a flowchart showing the operation of the first preferred embodiment.

FIG. 6 is a flowchart showing the operation of this preferred embodiment and its modification. In step S2, the altitude h at the present position provided by the navigation unit (NAVI) 14 is inserted into Eq. (1) mentioned above to obtain the atmospheric pressure P at the present position. In step S3, data on this atmospheric pressure P is stored.

In the modification shown in FIG. 10, step S1 is added to obtain the altitude h at the present position by the altitude detecting section 55b according to the present position (latitude and longitude) determined by the navigation unit 14 and the position/altitude conversion information recorded in the altitude database 55a.

On the other hand, in step S4, the result of detection of the tire inflation pressure and the wheel ID are extracted from the signal received by the receiving circuit 51, and it is determined in the ID comparing section 52 whether or not the wheel ID extracted above coincides with the wheel ID already recorded in the set value storing section 53. If the extracted wheel ID coincides with the recorded wheel ID, the extracted wheel ID and the result of detection of the tire inflation pressure are output to the inflation pressure calibrating section 56. In step S5, the result of detection of the tire inflation pressure is corrected to an inflation pressure at a standard temperature according to a present temperature. In step S6, the inflation pressure at the standard temperature is corrected to an inflation pressure at a reference atmospheric pressure according to the atmospheric pressure data stored in step S3, and this corrected inflation pressure is output to the inflation pressure diagnosing section 57. In this preferred embodiment, the tire inflation pressure is detected as an absolute pressure by the inflation pressure sensor 41, and the atmospheric pressure P is subtracted from this absolute pressure to obtain a gauge pressure, which is then output as the corrected tire inflation pressure.

In step S7, the inflation pressure diagnosing section 57 compares the corrected tire inflation pressure with a reference inflation pressure recorded in the set value storing section 53. If the corrected tire inflation pressure at present is lower than the reference inflation pressure, a predetermined error code is stored with data on the corrected tire inflation pressure into the storing section 58 in step S8. In step S9, the storing section 58 is periodically referred to by the error diagnosing section 59, and if the error code is stored in the storing section 58, the result of diagnosis corresponding to the stored error code is read from the set value storing section 53 and then output to the display unit 15.

According to this preferred embodiment, an atmospheric pressure is calculated from an altitude at the present position determined by the navigation unit 14, and the detected tire inflation pressure is calibrated to an inflation pressure at a reference atmospheric pressure according to the above-calculated atmospheric pressure. Accordingly, a sensor for detecting an atmospheric pressure is not necessary, and the detected tire inflation pressure can be accurately calibrated.

Figure 7:
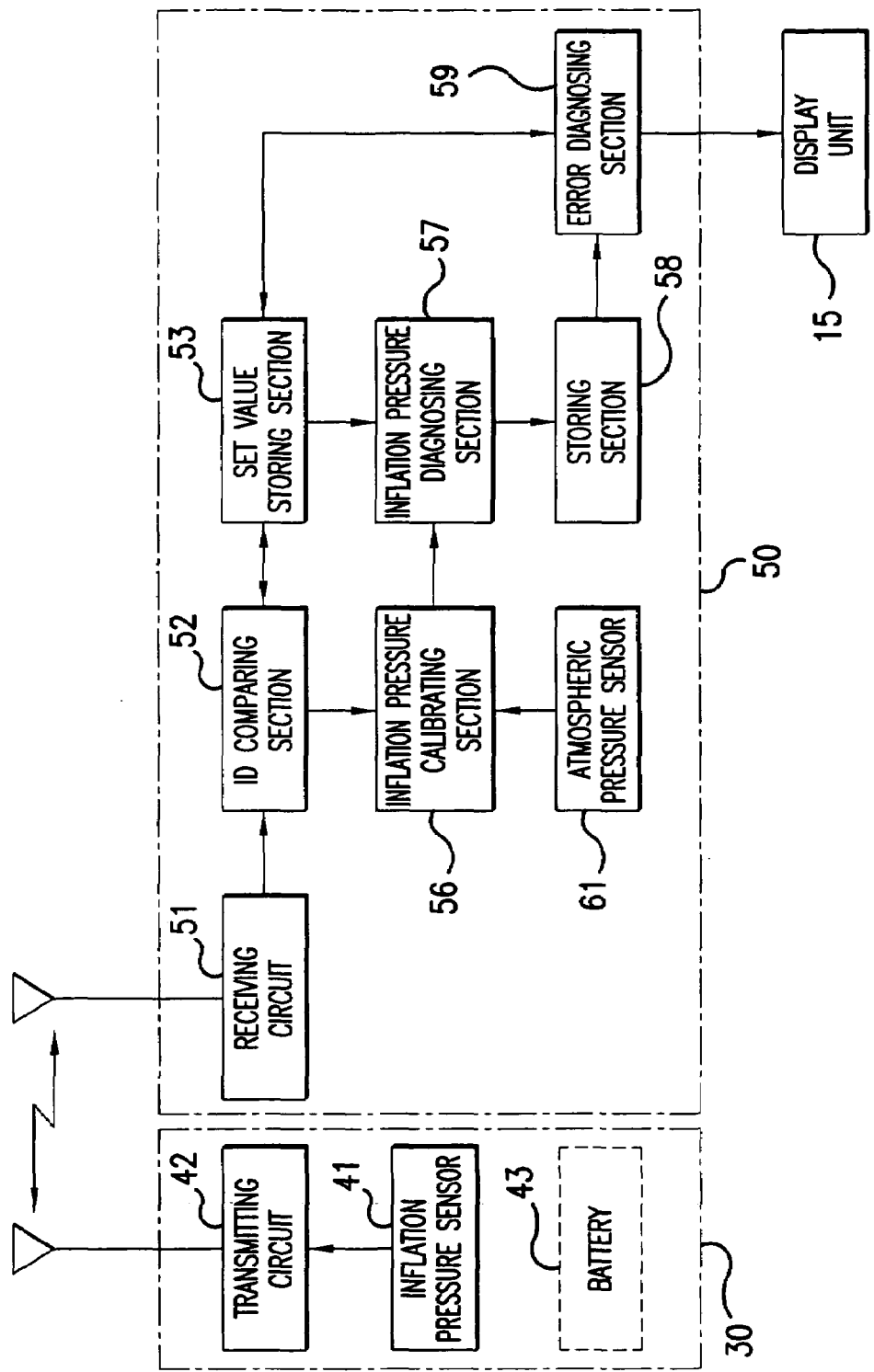
FIG. 7 is a block diagram of a second preferred embodiment of the tire inflation pressure monitoring device.

FIG. 7 is a block diagram showing the configuration of a second preferred embodiment of the tire inflation pressure monitoring device according to the present invention. In FIG. 7, the same reference numerals as those shown in FIG. 5 denote the same or like parts.

In the second preferred embodiment shown in FIG. 7, the diagnosing unit 50 includes an atmospheric pressure sensor 61 for detecting an atmospheric pressure. The result of detection of the tire inflation pressure received from the inflation pressure sensor unit 30 is calibrated to an inflation pressure at a reference atmospheric pressure according to a present atmospheric pressure detected by the atmospheric pressure sensor 61.

Figure 8:
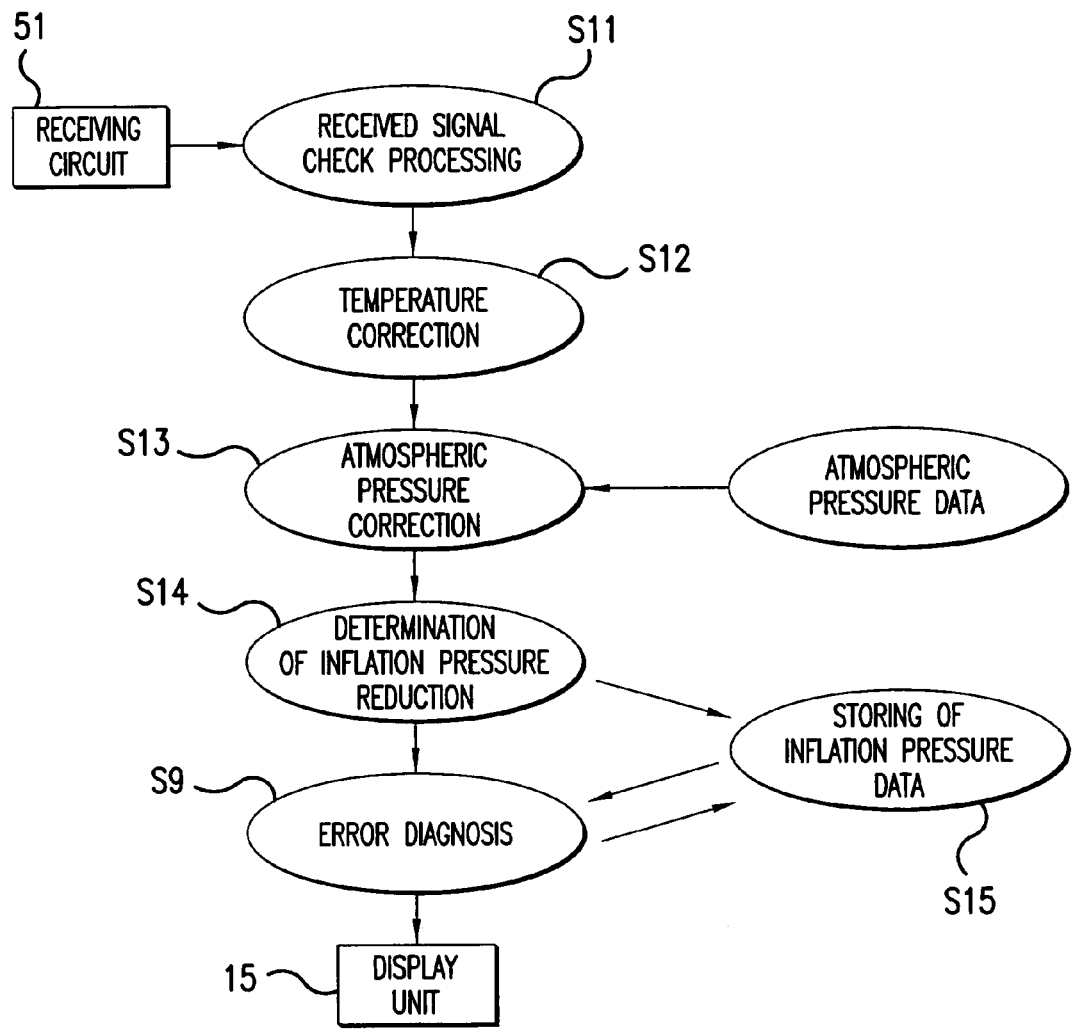
FIG. 8 is a flowchart showing the operation of the second preferred embodiment.

FIG. 8 is a flowchart showing the operation of the second preferred embodiment. In step S11, the result of detection of the tire inflation pressure and the wheel ID are extracted from the signal received by the receiving circuit 51, and it is determined in the ID comparing section 52 whether or not the wheel ID extracted above coincides with the wheel ID already recorded in the set value storing section 53. If the extracted wheel ID coincides with the recorded wheel ID, the extracted wheel ID and the result of detection of the tire inflation pressure are output to the inflation pressure calibrating section 56. In step S12, the result of detection of the tire inflation pressure is corrected to an inflation pressure at a standard temperature according to a present temperature. In step S13, the inflation pressure at the standard temperature is corrected to an inflation pressure at a reference atmospheric pressure according to data on the atmospheric pressure detected by the atmospheric pressure sensor 61, and this corrected inflation pressure is output to the inflation pressure diagnosing section 57.

In step S14, the inflation pressure diagnosing section 57 compares the corrected tire inflation pressure with a reference inflation pressure recorded in the set value storing section 53. If the corrected tire inflation pressure at present is lower than the reference inflation pressure, a predetermined error code is stored with data on the corrected tire inflation pressure into the storing section 58 in step S15. In step S16, the storing section 58 is periodically referred to by the error diagnosing section 59, and if the error code is stored in the storing section 58, the result of diagnosis corresponding to the stored error code is read from the set value storing section 53 and then output to the display unit 15.

According to the second preferred embodiment, the atmospheric pressure sensor 61 need not be provided in the inflation pressure sensor unit 30 on the tire side, so that the size reduction and power saving of the inflation pressure sensor unit 30 can be promoted.

Figure 9:
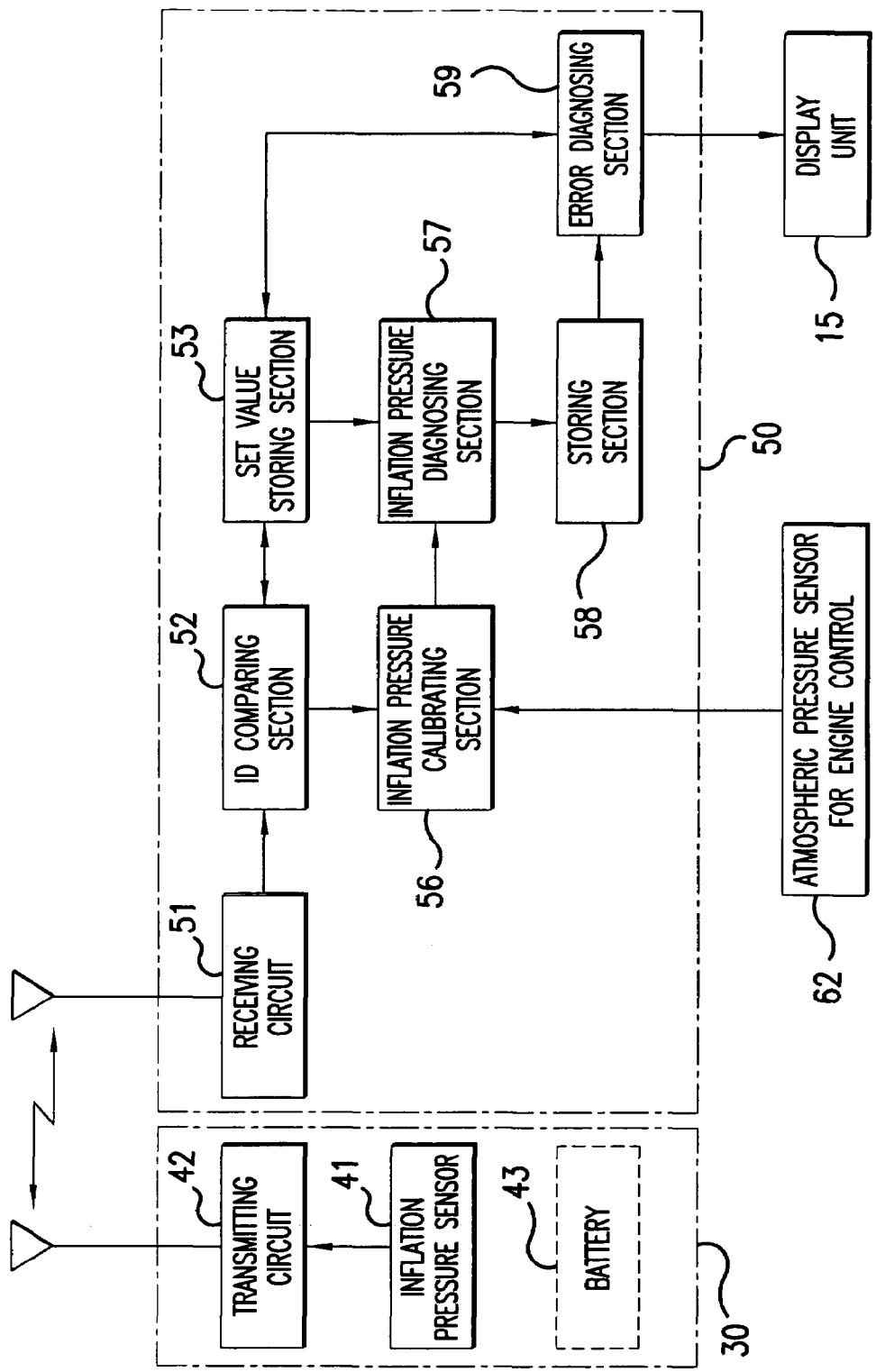
FIG. 9 is a block diagram of a third preferred embodiment of the tire inflation pressure monitoring device.

FIG. 9 is a block diagram showing the configuration of a third preferred embodiment of the tire inflation pressure monitoring device according to the present invention. In FIG. 9, the same reference numerals as those shown in FIG. 5 denote the same or like parts.

If the amount of fuel to be supplied to an engine in the case of high-altitude running is determined like in the case of low-altitude running according to an engine speed and an engine load, there arises a problem that an actual air-fuel ratio is deviated from a desired value toward a lean value. To prevent this problem, an atmospheric pressure sensor 62 for engine control is provided to detect a present atmospheric pressure and to perform "atmospheric pressure correction" such that when the atmospheric pressure decreases, the fuel supply amount is corrected by being increased.

In this preferred embodiment, this atmospheric pressure sensor 62 conventionally provided for engine control is utilized to calibrate the tire inflation pressure according to the atmospheric pressure detected by this sensor 62. Accordingly, even in a vehicle not including a navigation system or a GPS system, any atmospheric pressure sensor need not be provided in the diagnosing unit 50, and the tire inflation pressure can be accurately detected.

According to the third preferred embodiment, even in a vehicle not including a navigation system or a GPS system, an atmospheric pressure sensor need not be provided in the diagnosing unit 50, and the tire inflation pressure can be accurately detected.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tire inflation pressure monitoring device, comprising:
   a tire inflation pressure detecting section provided on a tire side, said tire inflation pressure detecting section detecting a tire inflation pressure, said tire inflation pressure detecting section including:
      an inflation pressure sensor, said inflation pressure sensor detecting the tire inflation pressure; and
      a transmitting unit, said transmitting unit transmitting by radio a result of detection of the tire inflation pressure from said inflation pressure sensor; and
   a tire inflation pressure diagnosing section provided on a vehicle body side, said tire inflation pressure diagnosing section receiving the result of detection of the tire inflation pressure from said inflation pressure sensor, calibrating the result of detection of the tire inflation pressure to an inflation pressure at a reference atmospheric pressure, and diagnosing the calibrated inflation pressure, said tire inflation pressure diagnosing section including:

a receiving unit, said receiving unit receiving the result of detection of the tire inflation pressure from said transmitting unit;

an inputting unit, said inputting unit inputting position information on a present position;

an atmospheric pressure detector, said atmospheric pressure detector detecting an atmospheric pressure at the present position according to the position information input by said inputting unit; and a calibrating unit, said calibrating unit calibrating the result of detection of the tire inflation pressure to the inflation pressure at the reference atmospheric pressure according to the atmospheric pressure detected by said atmospheric pressure detector.

2. The tire inflation pressure monitoring device according to claim 1, wherein said inputting unit inputs the position information on the present position from a GPS system.

3. The tire inflation pressure monitoring device according to claim 2, wherein said inputting unit inputs the position information on the present position from a GPS system in a navigation unit.

4. The tire inflation pressure monitoring device according to claim 1, wherein said tire inflation pressure diagnosing section further includes an ID comparing section that outputs the result of detection of the tire inflation pressure if a wheel ID included in a signal received by the receiving unit coincides with a wheel ID recorded in a set value storing section.

5. The tire inflation pressure monitoring device according to claim 2, wherein said tire inflation pressure diagnosing section further includes an ID comparing section that outputs the result of detection of the tire inflation pressure if a wheel ID included in a signal received by the receiving unit coincides with a wheel ID recorded in a set value storing section.

6. A vehicle having a tire inflation pressure monitoring device, comprising:

a navigation unit for determining a present position;

a tire inflation pressure detecting section provided on a tire side, said tire inflation pressure detecting section detecting a tire inflation pressure, said tire inflation pressure detecting section including:

an inflation pressure sensor, said inflation pressure sensor detecting the tire inflation pressure; and a transmitting unit, said transmitting unit transmitting by radio a result of detection of the tire inflation pressure from said inflation pressure sensor; and a tire inflation pressure diagnosing section provided on a vehicle body side, said tire inflation pressure diagnosing section receiving the result of detection of the tire inflation pressure from said inflation pressure sensor, calibrating the result of detection of the tire inflation pressure to an inflation pressure at a reference atmospheric pressure, and diagnosing the calibrated inflation pressure, said tire inflation pressure diagnosing section including:

a receiving unit, said receiving unit receiving the result of detection of the tire inflation pressure from said transmitting unit;

an obtaining unit, said obtaining unit obtaining position information on a present position from said navigation unit;

an atmospheric pressure detector, said atmospheric pressure detector detecting an atmospheric pressure at the present position according to the position information obtained by said obtaining unit; and a calibrating unit, said calibrating unit calibrating the result of detection of the tire inflation pressure to the inflation pressure at the reference atmospheric pressure according to the atmospheric pressure detected by said atmospheric pressure detector.

7. The vehicle having the tire inflation pressure monitoring device according to claim 6, wherein said navigation unit manages said position information in correspondence with altitude information.

8. The vehicle having the tire inflation pressure monitoring device according to claim 6, further comprising an outputting unit, said outputting unit outputting the calibrated tire inflation pressure to a display of said navigation unit.

9. The vehicle having the tire inflation pressure monitoring device according to claim 7, further comprising an outputting unit, said outputting unit outputting the calibrated tire inflation pressure to a display of said navigation unit.

10. The vehicle having the tire inflation pressure monitoring device according to claim 6, wherein said tire inflation pressure diagnosing section further includes an ID comparing section that outputs the result of detection of the tire inflation pressure if a wheel ID included in a signal received by the receiving unit coincides with a wheel ID recorded in a set value storing section.

11. The vehicle having the tire inflation pressure monitoring device according to claim 7, wherein said tire inflation pressure diagnosing section further includes an ID comparing section that outputs the result of detection of the tire inflation pressure if a wheel ID included in a signal received by the receiving unit coincides with a wheel ID recorded in a set value storing section.

12. A vehicle having a tire inflation pressure monitoring device, comprising:

a tire inflation pressure detecting section provided on a tire side, said tire inflation pressure detecting section detecting a tire inflation pressure, said tire inflation pressure detecting section including:

an inflation pressure sensor, said inflation pressure sensor detecting the tire inflation pressure; and a transmitting unit, said transmitting unit transmitting by radio a result of detection of the tire inflation pressure from said inflation pressure sensor; and a tire inflation pressure diagnosing section provided on a vehicle body side, said tire inflation pressure diagnosing section receiving the result of detection of the tire inflation pressure from said inflation pressure sensor, calibrating the result of detection of the tire inflation pressure to an inflation pressure at a reference atmospheric pressure, and diagnosing the calibrated inflation pressure, said tire inflation pressure diagnosing section including:

a receiving unit, said receiving unit receiving the result of detection of the tire inflation pressure from said transmitting unit; and a calibrating unit, said calibrating unit calibrating the result of detection of the tire inflation pressure to the inflation pressure at the reference atmospheric pressure according to atmospheric pressure input thereto.

13. The vehicle having the tire inflation pressure monitoring device according to claim 12, wherein said tire inflation pressure diagnosing section further comprises an atmospheric pressure sensor, and said calibrating unit calibrates the tire inflation pressure according to atmospheric pressure information detected by said atmospheric pressure sensor.

14. The vehicle having the tire inflation pressure monitoring device according to claim 12, wherein said calibrating unit calibrates the tire inflation pressure according to atmospheric pressure information detected by an atmospheric pressure sensor for engine control.

15. The vehicle having the tire inflation pressure monitoring device according to claim 12, wherein said tire inflation pressure diagnosing section further includes an ID comparing section that outputs the result of detection of the tire inflation pressure if a wheel ID included in a signal received by the receiving unit coincides with a wheel ID recorded in a set value storing section.

16. The vehicle having the tire inflation pressure monitoring device according to claim 13, wherein said tire inflation pressure diagnosing section further includes an ID comparing section that outputs the result of detection of the tire inflation pressure if a wheel ID included in a signal received by the receiving unit coincides with a wheel ID recorded in a set value storing section.

* * * * *